United States Patent [19]
Goss

[11] Patent Number: 6,021,978
[45] Date of Patent: Feb. 8, 2000

[54] ANTI-EXPLOSION PROTECTION SYSTEM FOR FLAMMABLE VAPORS

[76] Inventor: Clinton Gilbert Goss, P.O. Box 69, Lillie, La. 71256-0069

[21] Appl. No.: 09/055,422

[22] Filed: Apr. 4, 1998

[51] Int. Cl.[7] .................................................. B64D 37/32
[52] U.S. Cl. ..................................... 244/129.2; 244/135 B
[58] Field of Search ........................... 244/135 R, 135 B, 244/129.1, 129.2; 222/94, 95, 105, 386.5, 389; 220/720, 721

[56] References Cited

U.S. PATENT DOCUMENTS

| | | |
|---|---|---|
| 2,387,598 | 10/1945 | Mercier ............................... 244/135 B |
| 2,432,025 | 12/1947 | Lorenz ................................ 244/135 B |
| 2,653,780 | 9/1953 | Pepersack ........................... 244/135 B |
| 3,075,576 | 1/1963 | Herbert . | 
| 3,477,611 | 11/1969 | Niles . |
| 3,617,034 | 11/1971 | Skinner . |
| 3,693,825 | 9/1972 | Richman . |
| 3,747,800 | 7/1973 | Viland ....................................... 222/95 |
| 3,862,708 | 1/1975 | Waxlax ................................ 222/386.5 |
| 4,213,545 | 7/1980 | Thompson et al. .................. 222/386.5 |
| 4,902,304 | 2/1990 | Hallen . |
| 5,785,100 | 7/1998 | Showalter et al. ....................... 141/198 |

*Primary Examiner*—Galen L. Barefoot
*Attorney, Agent, or Firm*—Michael I. Kroll

[57] ABSTRACT

An anti-explosion protection system (10) for flammable vapors comprising a tank (12) for holding a flammable liquid (14) therein. An inflatable air bag (16) is within the tank (12) in a space above the flammable liquid (14). An assemblage (18) is for expanding and contracting the inflatable air bag (16) at the same rate as the flammable liquid (14) exits and enters the tank (12), thereby preventing the flammable vapors from forming within the space above the flammable liquid (14) which could explode and rupture the tank (12). An assembly (20) is for monitoring and visually indicating the movement of the flammable liquid (14) out of and into the tank (12).

24 Claims, 3 Drawing Sheets

ANTI-EXPLOSION PROTECTION SYSTEM FOR FLAMMABLE VAPORS

BACKGROUND OF THE INVENTION

1. Field of the Invention

The instant invention relates generally to gas storage reservoirs and more specifically it relates to an anti-explosion protection system for flammable vapors. The anti-explosion protection system for flammable vapors contains an inflatable air bag in a tank above a flammable liquid which expands and contracts at the same rate the flammable liquid exits and enters the tank. The inflatable air bag will prevent flammable vapors from forming to explode and rupture the tank. The anti-explosion protection system for flammable vapors is also lightweight, consumes a little electricity to operate, requires no servicing and is self-checking.

2. Description of the Prior Art

Numerous gas storage reservoirs have been provided in prior art. For example, U.S. Pat. No. 3,075,576 to Herbert; U.S. Pat. No. 3,477,611 to Niles; U.S. Pat. No. 3,617,034 to Skinner; U.S. Pat. No. 3,693,825 to Richman and U.S. Pat. No. 4,902,304 to Hallen all are illustrative of such prior art. While these units may be suitable for the particular purpose to which they address, they would not be as suitable for the purposes of the present invention as heretofore described.

HERBERT, DANUTA

IMPROVEMENTS IN RESERVOIRS FOR INTERNAL COMBUSTION ENGINES

U.S. Pat. No. 3,075,576

A liquid reservoir for statically holding varying liquid charges in voidless repose with a liquid center of gravity on a substantially predetermined axis during filling and emptying thereof despite tilting of the reservoir comprising a closed symmetrical liquid-tight chamber. An orifice means therein is for selectively introducing and extracting liquid from the chamber. A pair of multi-cellular elastic means symmetrically and fixedly line opposed portions of the reservoir. The elastic means occupy the entire inner volume of the reservoir when in a relatively relaxed condition. Meeting at an interface therein, the orifice means communicates with the interface. The pair of multicellular elastic means each are resiliently compressible away from the interface. Varying liquid charges are accepted at the interface in a symmetrical configuration with a substantially predetermined center of gravity during filling and emptying thereof without voids. Each cell of the multicellular elastic means communicates with an external gas cushion source.

NILES, HAROLD T.

FUEL TANK HAVING REDUCED FUEL VAPOR EMISSION

U.S. Pat. No. 3,477,611

A flexible impervious diaphragm fastened inside a relatively rigid fuel tank tends to rest on the surface of any fuel in the tank and thereby divides the tank into air and fuel chambers. A filler tube cap seats at two locations in the filler tube for the fuel tank and the air chamber is connected to the compartment formed in the filler tube between the two seats. A two-way check valve located in cap between the compartment and the atmosphere permits air flow into the air chamber at a low pressure differential and permits air flow out of the air chamber at a higher pressure differential. A one-way check valve between the compartment and the fuel chamber prevents air flow into the fuel chamber while permitting fuel vapors to flow out of the fuel chamber only at a still higher pressure differential.

SKINNER, DAVIS A.

INTERNAL COMBUSTION ENGINE FUEL SYSTEM MINIMIZING EVAPORATIVE FUEL LOSSES

U.S. Pat. No. 3,617,034

Fuel losses and accompanying air pollution are lessened by equipping an internal combustion engine with a fuel tank having a collapsible liquid fuel compartment and means for withdrawing any fuel vapors which form and combusting them in the engine.

RICHMAN, DOUGLAS A.

FUEL TANK HAVING BELLOWS FOR CONTROL OF FUEL EVAPORATION

U.S. Pat. No. 3,693,825

The exterior and interior of bellows expansible with the level of fuel in an automotive fuel tank divide the space in the tank above the fuel into a vapor space and a trap space. One end of the bellows is affixed to the roof of the tank and the other end to an insulator that covers substantially the entire surface of the fuel and floats on it. A conduit connects the vapor space to the trap space and has a flow restriction sufficient to retard diffusion between the spaces. Purge means are connected to communicate with the trap space.

HALLEN, WALTER R.

SEPARATE LOW PRESSURE GAS STORAGE SYSTEM

U.S. Pat. No. 4,902,304

A low pressure gas storage system comprising an annular anchor ring, a granular bed within the ring, a flexible membrane of gas storage chamber positioned above the bed, and a flexible membrane of air chamber encompassing the gas storage chamber and exerting pressure thereon. A plurality of flexible, radially-extending restraining means are position against and over the air chamber to exert a predetermined pressure thereon.

SUMMARY OF THE INVENTION

A primary object of the present invention is to provide an anti-explosion protection system for flammable vapors that will overcome the shortcomings of the prior art devices.

Another object is to provide an anti-explosion protection system for flammable vapors that contains an inflatable air bag within a tank in a space above a flammable liquid, in which the inflatable air bag expands and contracts at the same rate as the flammable liquid exits and enters the tank, thereby preventing flammable vapors from forming within the space to explode and rupture the tank.

An additional object is to provide an anti-explosion protection system for flammable vapors that is lightweight, consumes a little electricity to operate, requires no servicing except on failure and is self-checking.

A further object is to provide an anti-explosion protection system for flammable vapors that is simple and easy to use.

A still further object is to provide an anti-explosion protection system for flammable vapors that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
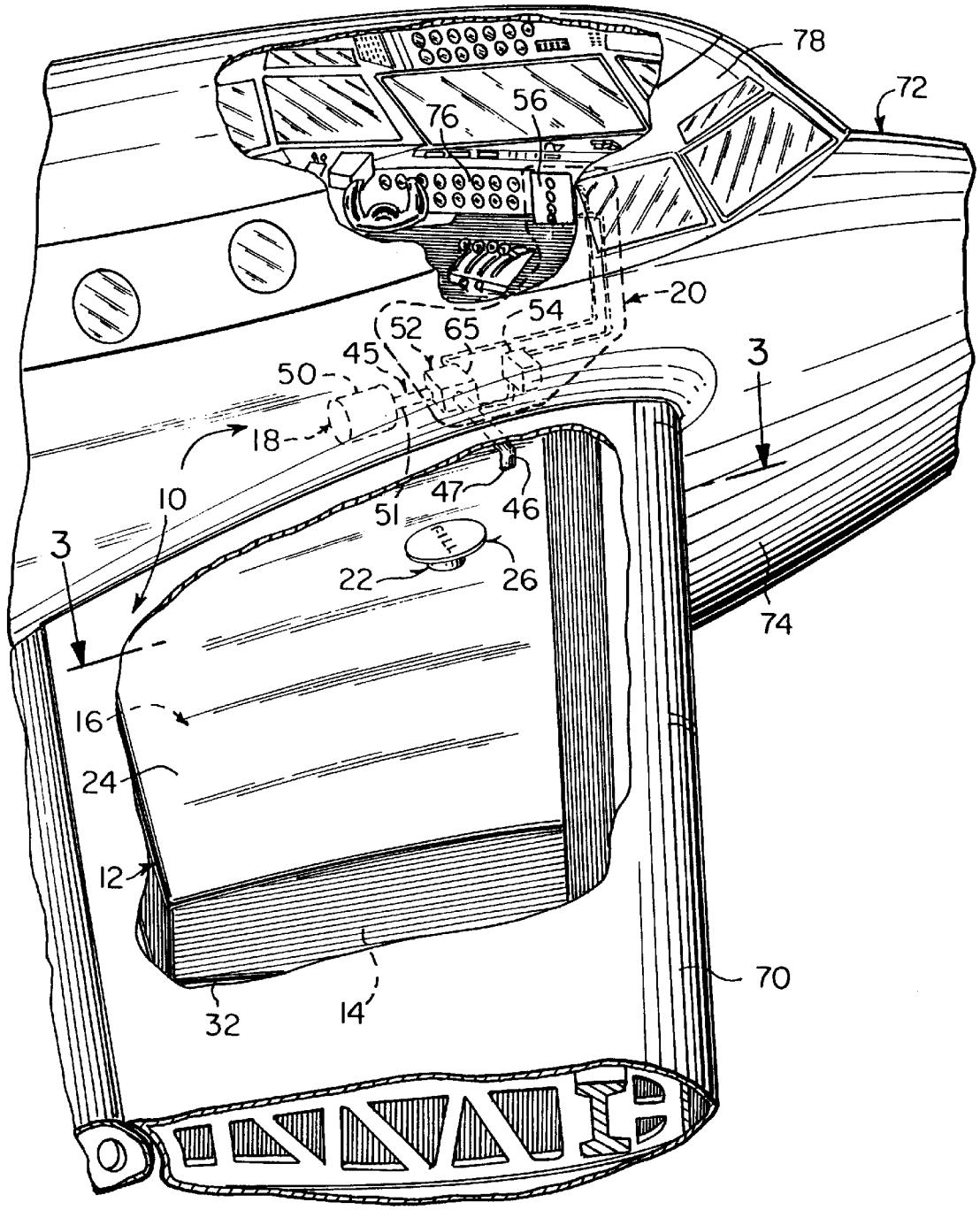
FIG. 1 is a side perspective view of an aircraft with parts broken away and in section, showing the present invention installed therein.
Figure 2:
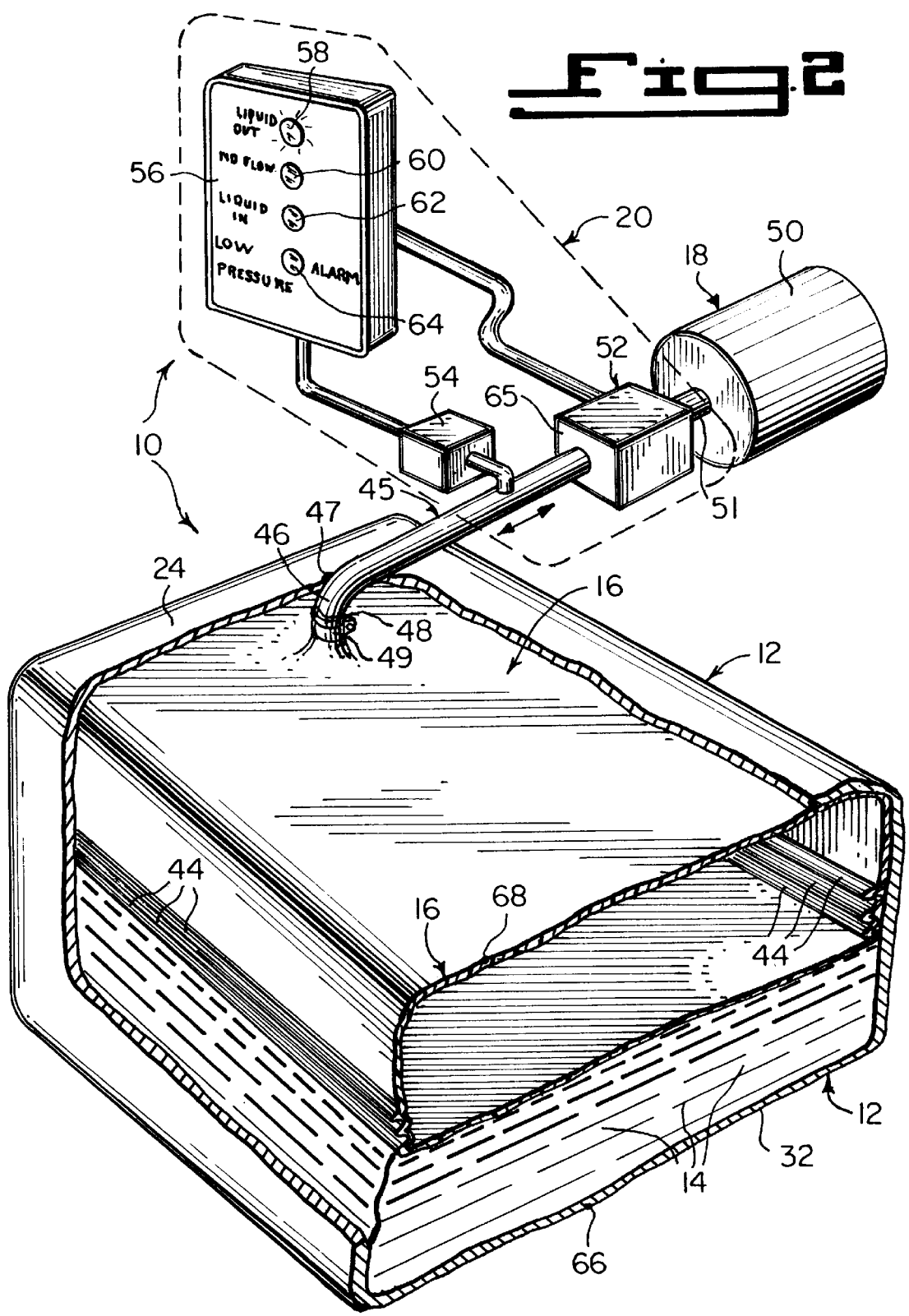
FIG. 2 is a perspective view of the present invention per se, with the tank and inflatable air bag broken away and in section.
Figure 3:
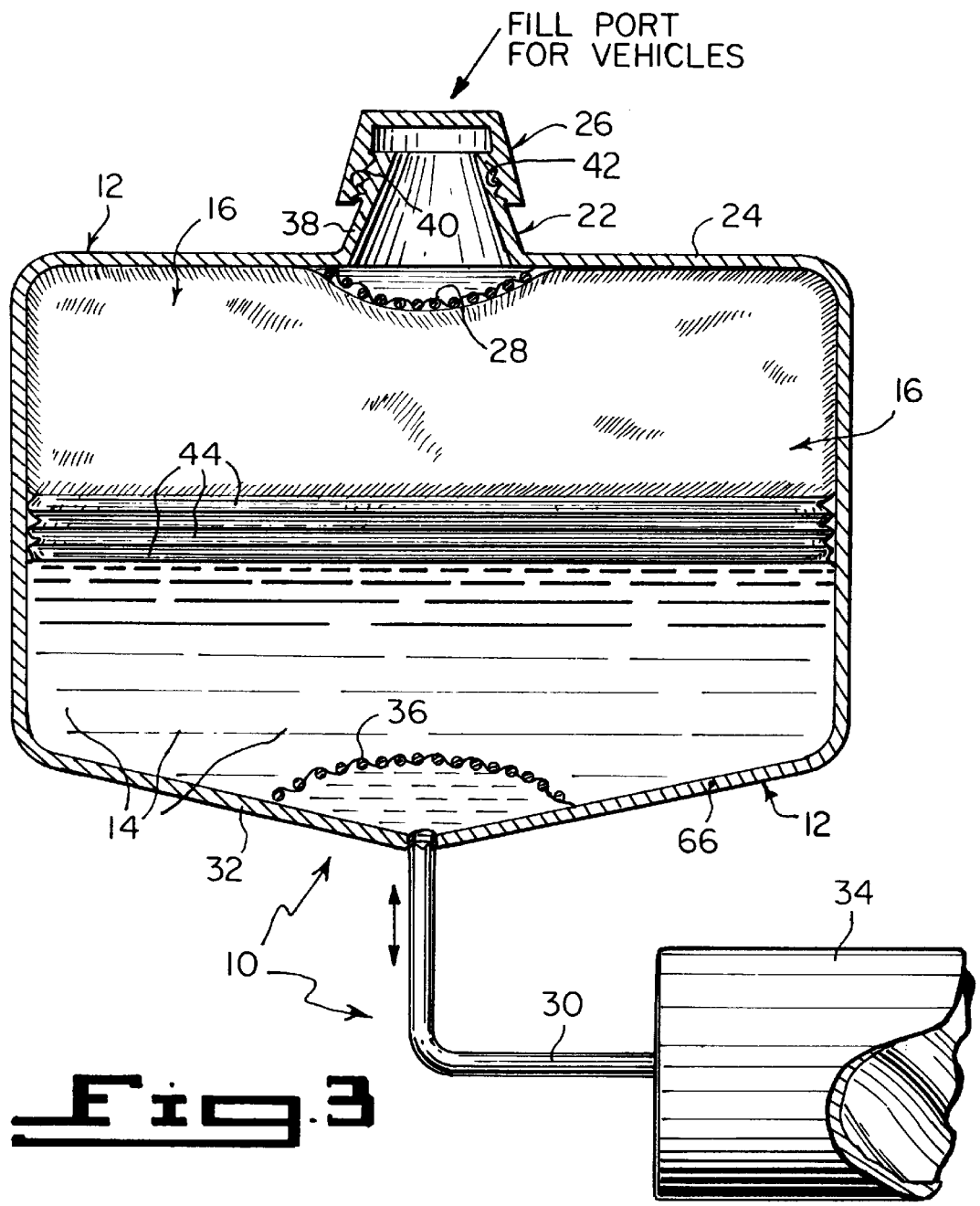
FIG. 3 is a cross sectional view taken along line 3—3 in FIG. 1, through the tank and inflatable air bag, showing a liquid pump connected to the bottom of the tank.

Turning now descriptively to the drawings, in which similar reference characters denote similar elements throughout the several views, FIGS. 1 through 3 illustrate the present invention being an anti-explosion protection system 10 for flammable vapors. With regard to the reference numerals used, the following numbering is used throughout the various drawing figures.

10 anti-explosion protection system
12 tank of 10
14 flammable liquid in 12
16 inflatable air bag of 10 in 12
18 expanding and contracting assemblage of 10 for 16
20 monitoring and visually indicating assembly of 10
22 filler tube on 24
24 top wall of 12
26 cap on 22
28 first filter screen member in 12 against 24 under 22
30 outlet and inlet line on 32
32 bottom wall of 12
34 fuel transfer pump on 30
36 second filter screen member in 12 against 32 over 30
38 truncated conical pipe for 22
40 externally threaded neck on 38
42 internal threads of 26
44 lower bellows segment of 16

45 air conduit of 18
46 first end of 45
47 connection between 46 and 12
48 neck of 16
49 clamp on 46 and 48
50 reversible flow direction constant low pressure air pump of 18
51 second end of 45
52 flow detector of 20 in 45
54 pressure sensor of 20 tapped into 45
56 flow monitor of 20 connected to 52 and 54
58 first lamp in 56
60 second lamp in 56
62 third lamp in 56
64 fourth lamp in 56
65 three position vane operated switch for 52
66 strong durable hard material (metal) of 12
68 thin flexible plastic material of 16
70 wing of 72
72 aircraft
74 fuselage of 72
76 instrument panel in 78
78 cockpit of 72

The anti-explosion protection system 10 for flammable vapors comprises a tank 12 for holding a flammable liquid 14 therein. An inflatable air bag 16 is within the tank 12 in a space above the flammable liquid 14. An assemblage 18 is for expanding and contracting the inflatable air bag 16 the same rate as the flammable liquid 14 exits and enters the tank 12, thereby preventing the flammable vapors from forming within the space above the flammable liquid 14, which could explode and rupture the tank 12. The anti-explosion protection system 10 further contains an assembly 20, for monitoring and visually indicating the movement of the flammable liquid 14 out of and into the tank 12.

A filler tube 22 is on a top wall 24 of the tank 12, to add the flammable liquid 14 into the tank 12, while a cap 26 is removably connected onto the filler tube 22. First filter screen member 28 is within the tank 12 and curved against the top wall 24 under the filler tube 22. An outlet and inlet line 30 extends from a bottom wall 32 of the tank 12. A fuel transfer pump 34 is fluidly attached to the outlet and inlet line 30, to remove and replace the flammable liquid 14. A second filter screen member 36 is within the tank 12 and curved against the bottom wall 32 over a connection of the outlet and inlet line 30.

As best seen in FIG. 3, the filler tube 22 is a truncated conical pipe 38 having an externally threaded neck 40. The cap 36 has an internally threaded collar 42, so that the cap 36 can thread onto and seal the truncated conical pipe 38. The inflatable air bag 16 includes a lower bellows segment 44 directly on a top surface of the flammable liquid 14 to permit unrestricted expansion and contraction of the inflatable air bag 16, when the flammable liquid 14 exits and enters the tank 12.

The expanding and contracting assemblage 18 consists of an air conduit 45 having a first end 46 connected at 47 to the tank 12 and extends into a neck 48 of the inflatable air bag 16. A clamp 49 on the first end 47 of the air conduit 45 is for holding the neck 48 of the inflatable air bag 16 securely thereto within the tank 12. A reversible flow direction constant low pressure air pump 50 is fluidly attached to a second end 51 of the air conduit 45, to supply air into and extract air out of the inflatable air bag 16.

The monitoring and visually indicating assembly 20 is best shown in FIG. 2 and comprises a flow detector 52 coupled into the air conduit 45. The flow detector 52 will detect the direction of air passing through the air conduit 45. A pressure sensor 54 is tapped into the air conduit 45. The pressure sensor 54 will sense the amount of air pressure within the air conduit 45. A flow monitor 56 is connected to the flow detector 52 and the pressure sensor 54. The flow monitor 56 has four lamps 58, 60, 62 and 64 thereon. When the flammable liquid 14 is exiting the tank 12 the first lamp 58 will be turned on to indicate "LIQUID OUT". When the flammable liquid 14 is not flowing the second lamp 60 will be turned on to indicate "NO FLOW". When the flammable liquid 14 is entering the tank 12 the third lamps 62 will be turned on to indicate "LIQUID IN". When an excess amount of the flammable liquid 14 leaves the tank 12 due to a fault in the tank 12 the fourth lamp 64 will be turned on to indicate "LOW PRESSURE ALARM".

The flow detector 52 is a three position vane operated switch 65 yielding an output proportional to a flow rate of air passing through the air conduit 45. The pressure sensor 54 has an electrical output proportional to a function of a flow rate of air pressure within the air conduit 45.

The tank 12 is fabricated out of a strong durable hard material 66. The strong durable hard material 66 is metal. The inflatable air bag 16 is fabricated out of a thin flexible plastic material 68 being impervious to the flammable liquid. The thin flexible plastic material 68 can be nylon or neoprene. The thin flexible plastic material 68 of the inflatable air bag 16 must withstand temperatures from between minus 55 degrees to 55 degrees Celsius.

One application of the anti-explosion protection system 10 is shown in FIG. 1. The tank 12 with the inflatable air bag 16 is installed within a wing 70 of an aircraft 72. The expanding and contracting assemblage 18 is carried within the fuselage 74 of the aircraft 72, while the flow monitor 56 of the monitoring and visually indicating assembly 20 is mounted onto the instrument panel 76 within the cockpit 78 of the aircraft 72. This allows the personnel in the cockpit 78 to look at the flow monitor 56 and checkout the operation of the anti-explosion protection system 10, when the aircraft 72 is in flight.

Other applications of the anti-explosion protection system 10, not shown in the drawings, can be used in petroleum tank farms, in other chemical tanks and in fuel tanks of various motor vehicles, wherein the flammable liquids within these respective tanks can vaporize and explode causing great harm and damage.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An anti-explosion protection system for flammable vapors comprising:
    a) a tank for holding a flammable liquid therein;
    b) an inflatable air bag within said tank in a space above the flammable liquid;
    c) means for expanding and contracting said inflatable air bag at the same rate as the flammable liquid exits and enters said tank, thereby preventing the flammable vapors from forming within said space above the flammable liquid which could explode and rupture said tank;
    d) a filler tube on a top wall of said tank to add the flammable liquid into said tank;
    e) a cap removably connected onto said filler tube;
    f) a first filter screen member within said tank and curved against said top wall under said filler tube;
    g) an outlet and inlet line extending from a bottom wall of said tank;
    h) a fuel transfer pump fluidly attached to said outlet and inlet line to remove and replace the flammable liquid; and
    i) a second filter screen member within said tank and curved against said bottom wall over a connection of said outlet and inlet line.

2. An anti-explosion protection system for flammable vapors as recited in claim 1, further including means for monitoring and visually indicating the movement of the flammable liquid out of and into said tank.

3. An anti-explosion protection system for flammable vapors as recited in claim 1, further including:
    a) said filler tube being a truncated conical pipe having an externally threaded neck; and
    b) said cap having an internally threaded collar, so that said cap can thread onto and seal said truncated conical pipe.

4. An anti-explosion protection system for flammable vapors as recited in claim 1, wherein said inflatable air bag includes a lower bellows segment directly on a top surface of the flammable liquid to permit unrestricted expansion and contraction of said inflatable air bag, when the flammable liquid exits and enters said tank.

5. An anti-explosion protection system for flammable vapors as recited in claim 2, wherein said expanding and contracting means includes:
    a) an air conduit having a first end connected to said tank and extending into a neck of said inflatable air bag;
    b) a clamp on a first end of said air conduit for holding the neck of said inflatable air bag securely thereto within said tank; and
    c) a reversible flow direction constant low pressure air pump fluidly attached to a second end of said air conduit to supply air into and extract air out of said inflatable air bag.

6. An anti-explosion protection system for flammable vapors as recited in claim 5, wherein said monitoring and visually indicating means includes:
    a) a flow detector coupled into said air conduit, whereby said flow detector will detect the direction of air passing through said air conduit;
    b) a pressure sensor tapped into said air conduit, whereby said pressure sensor will sense the amount of air pressure within said air conduit; and c) a flow monitor connected to said flow detector and said pressure sensor, said flow monitor having four lamps thereon, so that when the flammable liquid is exiting said tank said first lamp will be turned on to indicate "LIQUID OUT", when the flammable liquid is not flowing said second lamp will be turned on to indicate "NO FLOW", when the flammable liquid is entering said tank said third lamp will be turned on to indicate "LIQUID IN" and when an excess amount of the flammable liquid leaves said tank due to a fault in said tank said fourth lamp will be turned on to indicate "LOW PRESSURE ALARM".

7. An anti-explosion protection system for flammable vapors as recited in claim 6, wherein said flow detector is a three position vane operated switch yielding an output proportional to a flow rate of air passing through said air conduit.

8. An anti-explosion protection system for flammable vapors as recited in claim 6, wherein said pressure sensor has an electrical output proportional to a function of a flow rate of air pressure within said air conduit.

9. An anti-explosion protection system for flammable vapors as recited in claim 1, wherein said tank is fabricated out of a strong durable hard material.

10. An anti-explosion protection system for flammable vapors as recited in claim 9, wherein said strong durable hard material is metal.

11. An anti-explosion protection system for flammable vapors as recited in claim 1, wherein said inflatable air bag is fabricated out of a thin flexible plastic material being impervious to the flammable liquid.

12. An anti-explosion protection system for flammable vapors as recited in claim 11, wherein said thin flexible plastic material is nylon.

13. An anti-explosion protection system for flammable vapors as recited in claim 11, wherein said thin flexible plastic material is neoprene.

14. An anti-explosion protection system for flammable vapors as recited in claim 2, further including:
   a) said filler tube being a truncated conical pipe having an externally threaded neck; and
   b) said cap having an internally threaded collar, so that said cap can thread onto and seal said truncated conical pipe.

15. An anti-explosion protection system for flammable vapors as recited in claim 14, wherein said inflatable air bag includes a lower bellows segment directly on a top surface of the flammable liquid to permit unrestricted expansion and contraction of said inflatable air bag, when the flammable liquid exits and enters said tank.

16. An anti-explosion protection system for flammable vapors as recited in claim 15, wherein said expanding and contracting means includes:
   a) an air conduit having a first end connected to said tank and extending into a neck of said inflatable air bag;
   b) a clamp on a first end of said air conduit for holding the neck of said inflatable air bag securely thereto within said tank; and
   c) a reversible flow direction constant low pressure air pump fluidly attached to an second end of said air conduit to supply air into and extract air out of said inflatable air bag.

17. An anti-explosion protection system for flammable vapors as recited in claim 16, wherein said monitoring and visually indicating means includes:
   a) a flow detector coupled into said air conduit, whereby said flow detector will detect the direction of air passing through said air conduit;
   b) a pressure sensor tapped into said air conduit, whereby said pressure sensor will sense the amount of air pressure within said air conduit; and
   c) a flow monitor connected to said flow detector and said pressure sensor, said flow monitor having four lamps thereon, so that when the flammable liquid is exiting said tank said first lamp will be turned on to indicate "LIQUID OUT", when the flammable liquid is not flowing said second lamp will be turned on to indicate "NO FLOW", when the flammable liquid is entering said tank said third lamp will be turned on to indicate "LIQUID IN" and when an excess amount of the flammable liquid leaves said tank due to a fault in said tank said fourth lamp will be turned on to indicate "LOW PRESSURE ALARM".

18. An anti-explosion protection system for flammable vapors as recited in claim 17, wherein said flow detector is a three position vane operated switch yielding an output proportional to a flow rate of air passing through said air conduit.

19. An anti-explosion protection system for flammable vapors as recited in claim 18, wherein said pressure sensor has an electrical output proportional to a function of a flow rate of air pressure within said air conduit.

20. An anti-explosion protection system for flammable vapors as recited in claim 19, wherein said tank is fabricated out of a strong durable hard material.

21. An anti-explosion protection system for flammable vapors as recited in claim 20, wherein said strong durable hard material is metal.

22. An anti-explosion protection system for flammable vapors as recited in claim 21, wherein said inflatable air bag is fabricated out of a thin flexible plastic material being impervious to the flammable liquid.

23. An anti-explosion protection system for flammable vapors as recited in claim 22, wherein said thin flexible plastic material is nylon.

24. An anti-explosion protection system for flammable vapors as recited in claim 22, wherein said thin flexible plastic material is neoprene.

* * * * *